United States Patent [19]

Sandrock

[11] Patent Number: 4,730,722
[45] Date of Patent: Mar. 15, 1988

[54] WALKING BEAM DRIVE APPARATUS
[75] Inventor: Don G. Sandrock, McHenry, Ill.
[73] Assignee: Emerson Electric Co., St. Louis, Mo.
[21] Appl. No.: 3,809
[22] Filed: Jan. 16, 1987
[51] Int. Cl.$^4$ .......................... B65G 25/04; B23Q 7/04
[52] U.S. Cl. ................................. 198/774; 414/744 R; 414/749
[58] Field of Search ................ 198/774; 414/728, 733, 414/735, 744 R, 744 A, 744 B, 744 C, 749-753

[56] References Cited

U.S. PATENT DOCUMENTS

| | | |
|---|---|---|
| 3,139,171 | 6/1964 | Umbricht et al. |
| 3,306,434 | 2/1967 | McConnell |
| 3,857,496 | 12/1974 | Gonzales ........................ 414/744 R |
| 3,885,680 | 5/1975 | Rasenberger .................. 198/774 X |
| 3,907,098 | 9/1975 | Babbitt |
| 4,032,018 | 6/1977 | Wallis ................................ 414/750 |
| 4,151,907 | 5/1979 | Doty .................................... 198/774 |
| 4,256,218 | 3/1981 | Gerben et al. |
| 4,397,174 | 8/1983 | Jungesjo ......................... 198/774 X |
| 4,403,907 | 9/1983 | Koller et al. .................... 414/744 R |
| 4,407,405 | 10/1983 | Rise .................................... 198/774 |
| 4,440,291 | 4/1984 | Brems |
| 4,513,853 | 4/1985 | Maier et al. |
| 4,538,721 | 9/1985 | Westman ............................. 198/774 |

FOREIGN PATENT DOCUMENTS

0137176  10/1979  Japan .

OTHER PUBLICATIONS

Pick-O-Matic Systems 3-page brochure re Lift and Transfer System, and Walking Transfer Beam.
Commercial Cam (CAMCO) Parallel Index Drive-Applications-pp. D-2 and D-4 of CAMCO catalog, re Walking Beam Applications for Parallel Index Drives.
Commercial Cam (CAMCO) CAMBOT ® catalog (pp. J-1 through J-9).
Load/Unload Systems by Android 3-page brochure (undated) showing two Commercial Cam (CAMCO) Walking Beam Layouts.
Commercial Cam (CAMCO) Engineering Drawing No. M-34703, dated Sep. 28, 1984, entitled "400 LPP Walking Beams".

*Primary Examiner*—Robert J. Spar
*Assistant Examiner*—Lyle M. Kimms

[57] ABSTRACT

An improved cam-actuated drive apparatus is disclosed for use with walking beam transfer devices. The improved drive apparatus includes a sngle drive unit having two cams keyed to a common drive shaft and with an output dial mounting member providing both rotary and lifting motions, a lift carriage assembly operatively raised and lowered by the output dial mounting member to which the lift carriage assembly is rotatably mounted by a bearing member, a horizontal slide carriage assembly which is supported on the lift carriage assembly for sliding movement relative thereto, and a crank arm mounted to an extended hub of the output dial mounting member and rotatably connected to the horizontal slide carriage assembly, which arm translates rotational motion of the output dial mounting member into linear sliding motion of the horizontal slide carriage assembly relative to the lift carriage assembly.

8 Claims, 4 Drawing Figures

WALKING BEAM DRIVE APPARATUS

FIELD OF THE INVENTION

This invention relates to cam-actuated drive mechanisms, and more specifically to a cam-actuated drive apparatus for a so-called walking beam transfer device of the type providing both lifting and linear sliding transfer motions.

BACKGROUND OF THE INVENTION

The drives for walking beam transfer devices most often consist of two separate drive units. The first is a lift drive; it normally is a parallel plate cam-type oscillator drive unit with a crank arm and link connecting the drive to the transfer beam to be lifted. The second is a horizontal slide drive; it usually comprises a parallel-plate-cam-type index drive unit which also has a crank arm and link connecting it to the transfer beam to be horizontally slid.

Both such lift and horizontal slide drives normally require separate drive motors, gear reducers, overload clutches, and electrical sensing devices to maintain timing of one drive unit with the other. Further, only relatively short transfer strokes, i.e., horizontal slide motions, of approximately 10-15" maximum in length are available with the walking beam drives presently available. Longer horizontal strokes are available only with the addition of relatively expensive hypo-cycloidal arms.

The present invention provides a novel walking beam drive apparatus utilizing a single drive unit having two internal cams. These two drive cams are keyed to a common shaft in the single drive unit so that timing between the lift and rotation motions is constant and cannot be lost as would be the case with the dual drives of the prior art. One of the two cams provides a lifting motion to an output dial mounting plate while the other provides a rotary motion to that plate; the rotary motion is then converted into linear sliding motion.

A lift carriage assembly is guided for vertical movement upon stationary vertical guide posts having linear bearings. This lift carriage assembly is attached to the output dial mounting plate of the cam-actuated drive unit by means of a large diameter bearing which allows rotary motion of the output dial mounting plate without rotating the lift carriage assembly, the latter being stabilized against rotation by the vertical guide posts upon which it rides. However, as the output dial mounting plate of the cam-actuated drive is vertically raised and lowered, so is the lift carriage assembly correspondingly raised and lowered.

A horizontal slide carriage assembly is slidingly supported on the lift carriage assembly by use of horizontal guide rods and linear bearings. A crank arm with roller follower is mounted to a raised hub of the output dial mounting plate. The crank arm's roller rides within a Scotch yoke-type track mounted to a mounting plate of the horizontal slide assembly. In this fashion, the rotary motion of the output dial mounting plate is converted into horizontal sliding motion such that the horizontal slide assembly can be linearly moved relative to the lift carriage assembly.

Thus, it is a principal object of the present invention to provide a cam-actuated drive apparatus for a walking beam transfer device which drive apparatus has two drive cam members for providing one output member with both rotary motion and lifting motion, and structure for converting the rotary motion into horizontal sliding motion.

It is a further object of the present invention to convert a cam-actuated rotary pick-and-place drive unit into a walking beam drive apparatus.

It is a still further object of the present invention to utilize a cam-actuated single drive unit which provides both lifting and rotary motions for a walking beam drive apparatus without the need for any sensing mechanisms to correlate the timing of the respective lift and linear transfer drive motions.

It is another object of the present invention to provide a walking beam drive apparatus which has structure for supporting a lift carriage on a rotating and vertically oscillating output member of a rotary pick-and-place drive unit without effecting any rotation of the lift carriage, and also structure for converting the rotary output motion of the output member into linear sliding motion of a horizontal slide carriage which is slidingly supported on the lift carriage.

The means by which the foregoing and other objects of the present invention are accomplished and the manner of their accomplishment will be readily understood from the following specification upon reference to the accompanying drawings, in which.

DESCRIPTION OF THE PREFERRED EMBODIMENT

Figure 1:
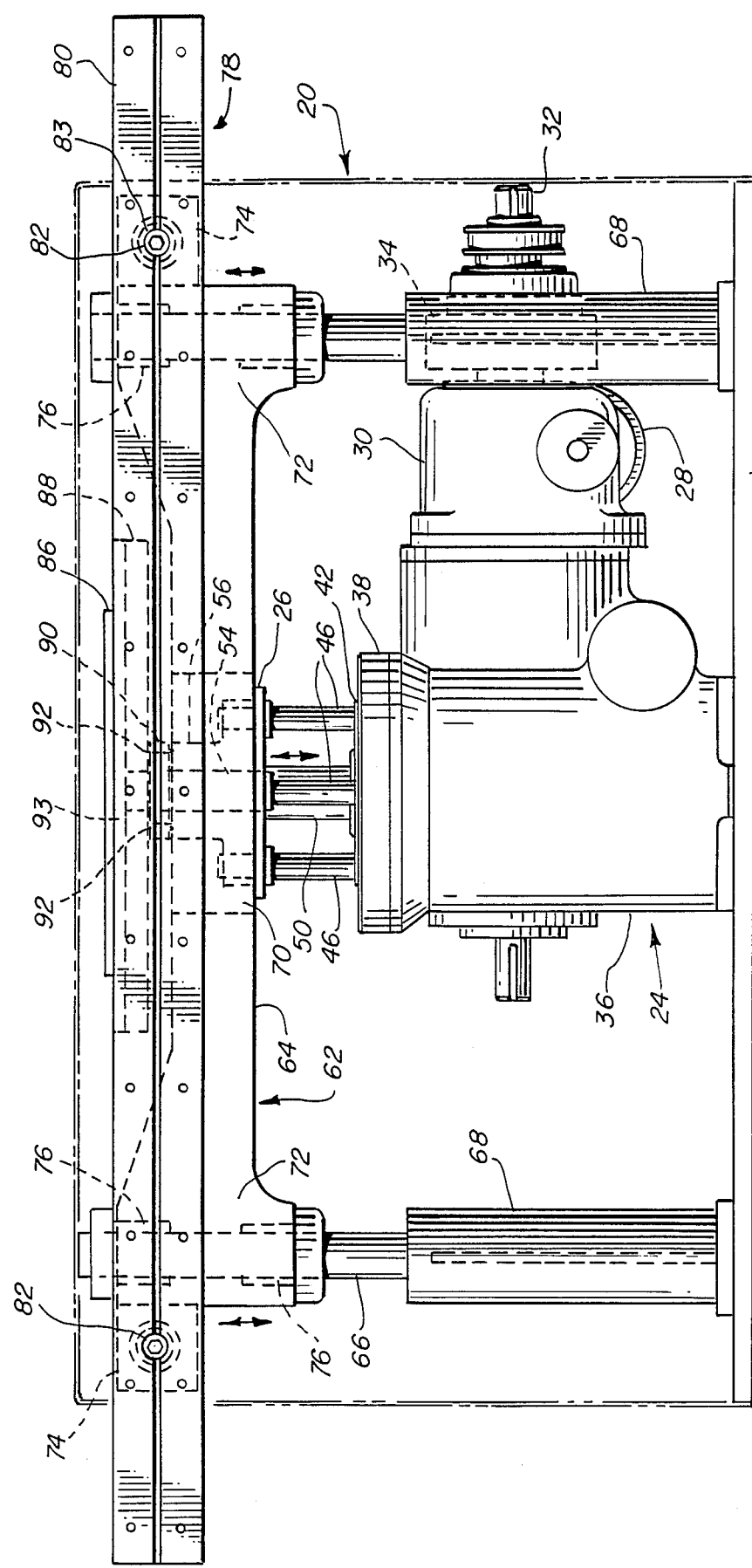
FIG. 1 is a front elevation view of the improved walking beam drive apparatus of the present invention.

Having reference to the drawings, wherein like reference numerals indicate corresponding elements, there is shown in FIG. 1 the improved walking beam drive apparatus of the present invention, generally denoted by reference number 20. Upon a base 22 is mounted a cam-actuated single drive unit 24 of the type which provides both rotary and lifting motions to an output dial mounting plate 26. The cam drive unit 24 is driven by a motor 28 and gear reducer 30 and has a unitary input cam shaft 32. An overload clutch 34 is preferably utilized in the above-described drive train for cam-actuated drive unit 24 to prevent any damage to the drive cams (not shown) of drive unit 24.

In the preferred embodiment, the cam-actuated drive 24 is a single drive unit having two internal roller gear cams (not shown) which are pre-timed and keyed to the common input shaft 32. It is to be understood that there are known single drive units having two cams, with one cam for providing the lifting motion and the other cam for providing the rotary motion to a common output member. A typical example of such a cam-actuated single drive unit providing both lifting and rotary motions is disclosed in U.S. Pat. No. 4,403,907. In the preferred embodiment, the specific cam design utilized for the rotary cam (not shown) of drive unit 24 would be so made as to provide a two-stop indexer motion, i.e., rotary motion for 180°, then a dwell, then an additional 180° of rotary motion.

Figure 4:
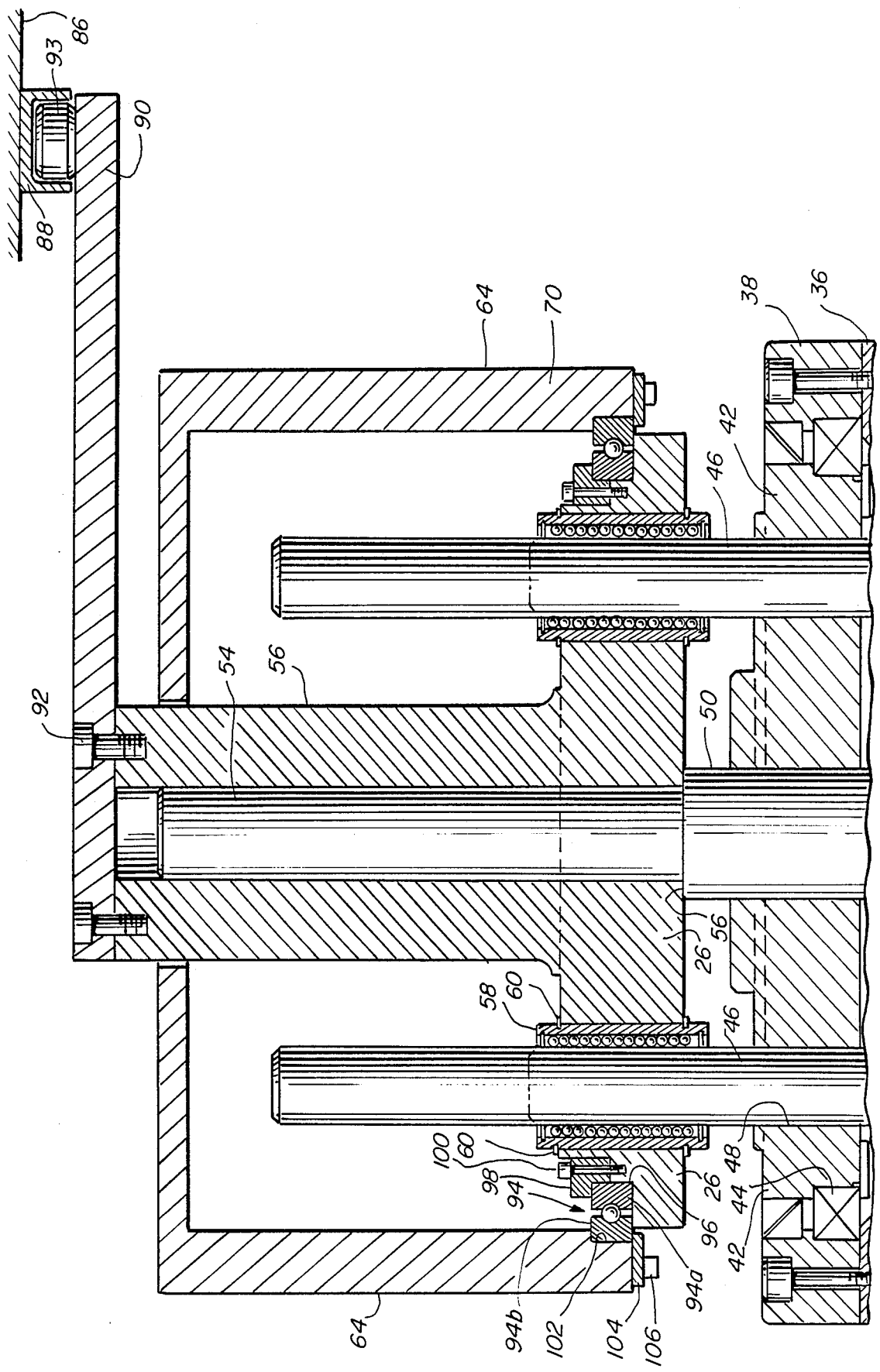
FIG. 4 is an enlarged sectional view of the output dial mounting plate of the present invention and its relative connections to the lift carriage assembly and horizontal slide assembly, as taken along lines 4—4 of FIG. 2.

The cam-actuated drive unit 24 includes a housing 36 with an enlarged upper shoulder portion 38 bolted thereto by fasteners 40 (see FIG. 4). A follower wheel 42 is rotatably journalled to housing portion 38 by an appropriate four-point contact bearing 44 (known as a "Kaydon" bearing). A series, preferably four, of vertical guide rods 46 have their lower ends press fit into appropriate openings 48 formed in the follower wheel 42. The center lift rod 50 of drive unit 24 is slidably and rotatably journalled through the follower wheel 42. The output dial mounting plate 26 rests against a shouldered portion 52 of center lift rod 50, while a reduced diameter extension 54 of lift rod 50 extends on through a raised hub portion 56 of plate 26. As seen in FIG. 4, the four guide rods 46 extend through linear bushings 58 which are retained by snap rings 60 to the dial mounting plate 26.

A lift carriage assembly, generally denoted by reference numeral 62 (see FIGS. 1 and 2), comprises a configured lift beam 64. The beam 64 is journalled and stabilized at each end for vertical sliding movement upon two stationary vertical guide posts 66 which are rigidly supported by guide bases 68 upon the machine base 22. The lift beam 64 is specially configured to have a relatively wide central portion 70 (FIG. 2) which is supported for vertical lifting by the output dial mounting plate 26, upon which beam 64 is also rotationally mounted, as explained more fully later herein.

Figure 2:
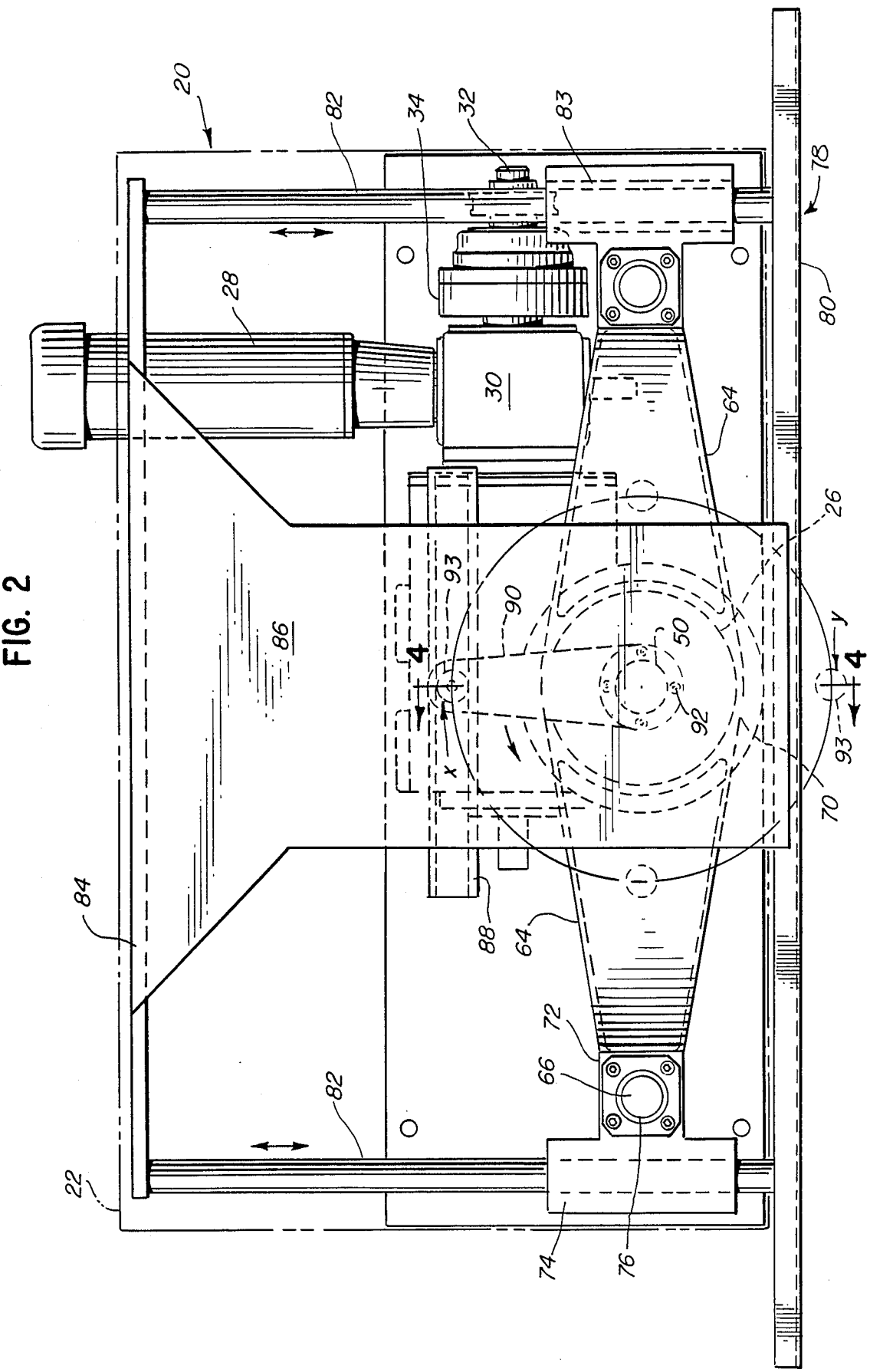
FIG. 2 is a plan view of the walking beam drive apparatus.

The outer ends of lift beam 64 are configured to have upstanding elongated portions 72 which terminate in transversely-aligned elongated portions 74 (see FIGS. 1 and 2). The two vertical guide posts 66 are journalled by linear bearings 76 through the vertical end portions 72 of lift beam 64. It will be understood that instead of two guide posts 66, four or more such stationary guide posts could be used to vertically stabilize the lift beam 64.

A horizontal slide carriage assembly 78 comprises a horizontal slide tool mount 80 connected by two horizontal slide rods 82 to a horizontal slide tail member 84. The slide rods 82 are slidingly received within and supported by linear bearings 83 carried by elongated end portions 74 of lift beam 64. The elongated end portions 74 act to stabilize the slide rods 82, and thus the horizontal slide carriage assembly 78, during horizontal sliding movement thereof vis-a-vis the lift carriage assembly 62. A Y-shaped slide track mounting plate 86 connects the tool mounting plate 80 and the tail member 84 centrally of the two horizontal slide rods 82. Carried transversely on the underside of the slide track mounting plate 86 is a Scotch-yoke mounting track 88.

A crank arm 90 operating as a rotary motion transfer member is rigidly fastened by guide pin fasteners 92 to the upper end of an upwardly extended hub portion 56 of output dial plate 26. A roller follower 93 carried at the outer end of crank arm 90 rides within the captive Scotch-yoke mounting track 88 horizontal slide carriage assembly 78.

Figure 3:
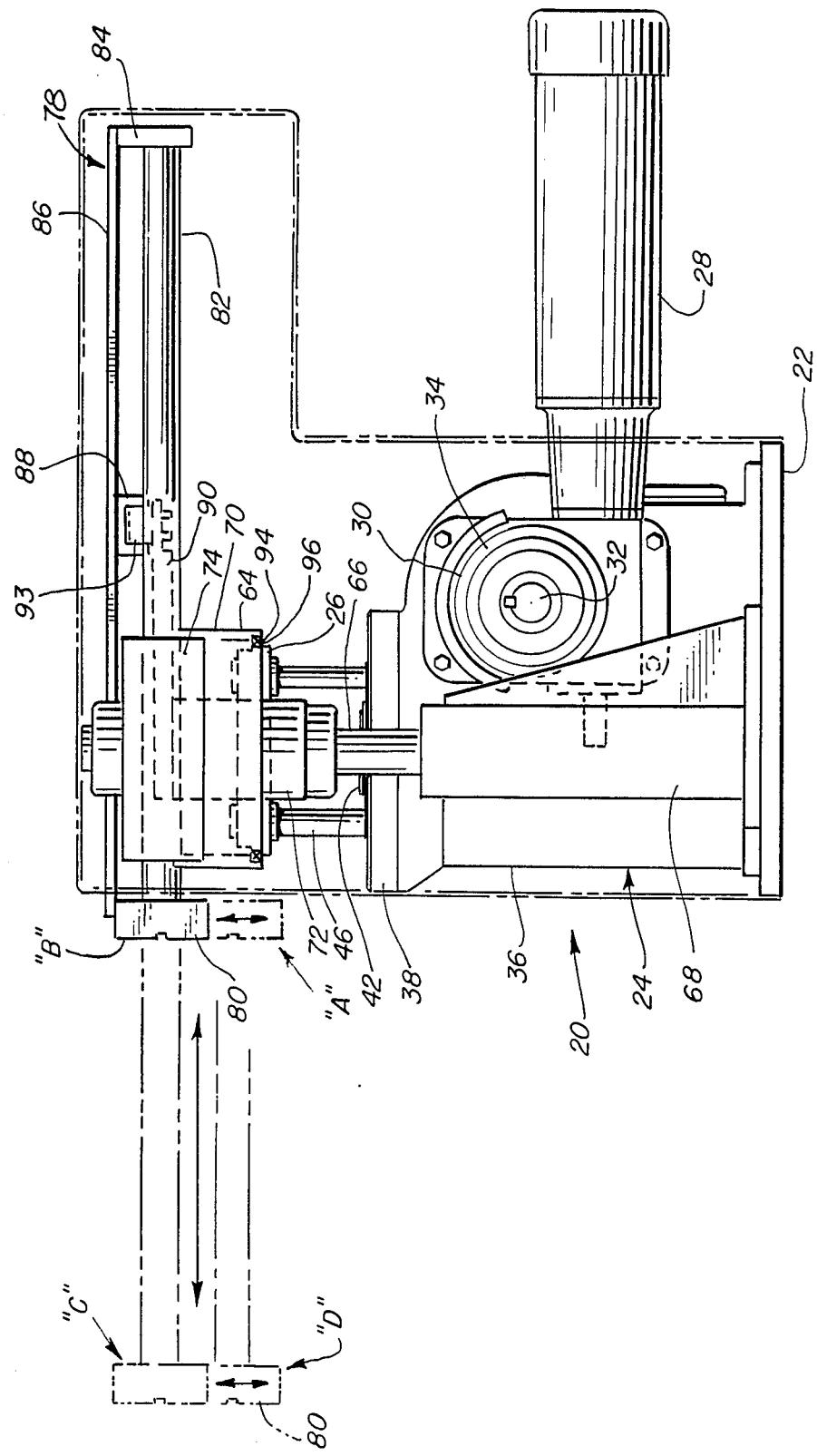
FIG. 3 is a side elevation of the walking beam drive apparatus and depicting various operational positions thereof.

As shown in FIGS. 3 and 4, the lower edge of central portion 70 of lift beam 64 is supported upon output dial mounting plate 26, at the peripheral edge thereof, by a large diameter four-point contact bearing, depicted generally by reference numeral 94. The inner bearing ring 94b of bearing 94 is rigidly affixed to a shouldered surface 96 of output dial mounting plate 26 by a clamp 98 and a plurality of fasteners 100. The outer bearing ring 94b of bearing 94 is similarly secured to a shouldered surface 102 of the center portion 70 of lift beam 64; it is held in place by bearing retainer 104 and fasteners 106. Thus, any lifting motion of output dial mounting plate 26 will cause the lift beam 64 to be correspondingly raised and lowered. However, due to the presence of bearing 94, any rotation of dial mounting plate 26 will not be transferred to lift beam 64 since the latter is stabilized against rotation by the two vertical guide posts 66.

Turning to the operation of the improved walking beam drive apparatus 20 of the present invention, it will be understood that operation of the cam-actuated single drive unit 24 creates an output motion for the output dial mounting plate 26 that is vertically raised and lowered due to the vertically reciprocating center lift rod 50, as well as is rotationally indexed due to the two-stop, 180° indexed rotational movement of follower wheel 42 and guide rods 46. This operation of output dial mounting plate 26 is performed in a well known manner; reference is made to U.S. Pat. No. 4,403,907 for a description of the operation of a typical rotary pick-and-place drive unit, such as the type drive preferably used for the cam-actuated single drive unit 24 of the present invention, which drive unit 24 is modified in accordance herewith. Also, as is well known, the specific cam design for each of the two drive cams (not shown) utilized in single drive unit 24 can be so constructed as to customize the operating output motions for the output dial mounting plate 26 for any given walking beam transfer device installation. For example, the cams can be designed to give a "soft" pick-up or placement of a part being transferred, or can result in a specific motion path for any associated output structure for the walking beam transfer device.

In the preferred embodiment, initial rotation of the cam drive shaft 32 by motor 28 and gear reducer 30 will cause a lifting of the center lift rod 50 of drive unit 24. A lifting of center lift rod 50 causes the output dial mounting plate 26 to be correspondingly lifted. Similarly, lifting of mounting plate 26 causes the lift carriage assembly 62 to be correspondingly raised, since lift beam 64 of lift carriage assembly 62 is supported on, but does not rotate with, mounting plate 26 due to the large diameter, four-point contact bearing 94. Such lifting motion of lift carriage assembly 62 also correspondingly causes the horizontal slide carriage assembly 78 and its various components to correspondingly be lifted due to the support of the horizontal slide rods 82 by the lift beam 64.

Continued operation of cam-actuated drive unit 24 causes the follower wheel 42 to be rotated 180° in the preferred embodiment. This causes the follower wheel 52 and the four guide rods 46 secured thereto to rotate the output dial mounting plate 26 through which the rods 46 are bearingly received. However, such a 180° rotation of the output dial mounting plate 26 does not cause any rotation of the lift carriage assembly 62, which is stabilized thereagainst by stationary vertical guide posts 66. Rotation of mounting plate also is not transferred to the lift assembly 62 due to the presence of the bearing 94 which rotationally supports center portion 70 of lift beam 64 upon the outer peripheral shouldered edge 95 of output dial mounting plate 26. In other words, the dial mounting plate 26 is always free to rotate without rotating the lift beam 64. Such rotation of the output dial mounting plate 26 and its raised hub 56 does, however, automatically rotate crank arm 90 (and follower 93) which is rigidly connected thereto.

Because of the Scotch-yoke connection between follower 93 on crank arm 90 and the captive track 88 carried by slide track mounting plate 86, such a 180° rotation of crank arm 90 and follower 93 causes the horizontal slide carriage assembly 78 to be driven through, i.e., converted into, a horizontal sliding motion. That is, because the crank arm 90 goes through the two-stop, 180° rotary indexing motion of the cam-actuated drive unit 24 due to the rigid connection of arm 90 to the output dial mounting plate hub 56, the horizontal slide carriage assembly 78 is linearly driven through the distance, i.e., horizontal stroke, as shown between the uppermost location "X" of roller follower 93 in FIG. 2 and its lowermost phantom position "Y" as shown in that Figure.

Thus, depending on the actual length chosen for the crank arm 90, relatively long horizontal transfer strokes can be generated by the improved walking beam drive unit 20 of the present invention. For example, with the preferred embodiment of the present invention, transfer strokes of approximately 60" are available.

A further continued operation of the cam-actuated drive unit 24 produces a lowering of the center lift rod 50, whereby the output dial mounting plate 26 and lift carriage assembly 62, and the horizontal slide assembly 78 carried thereby, are correspondingly lowered. Yet further operation of the drive unit 24 again lifts the center lift rod 50, mounting plate 26, lift carriage assembly 62, and horizontal slide assembly 78. Still further operation of the drive unit 24 effects another 180° rotation of crank arm 90 whereby the horizontal slide carriage assembly 78 is driven back to its starting position (shown in solid in FIG. 2, where roller 93 is at position "X").

In summary, a typical operational sequence as described above for the preferred embodiment of the improved walking beam drive apparatus 20 of the present invention is a motion pattern which has (see FIG. 3) the horizontal tool mounting plate 80 being driven upwardly from the phantom lowered position A to the solid upper position B, outwardly to the phantom position C, then downwardly to the phantom position D, and then back to position C, then B, and finally returning to position A. Also, as will be appreciated, any number of different motion patterns can be generated for the walking beam drive apparatus 20, depending upon the specific design of the two lift and rotary cams (not shown) of drive unit 24.

Thus, there is a significant advantage in the improved walking beam drive unit 20 of the present invention in that with the cam-actuated single drive unit 24, both lifting and horizontal slide motions can be achieved. This is a significant advantage over the prior art type walking beam designs where two separate drive units were required, which in turn required motion sensing mechanisms to correlate the timing of the respective drive units. Such timing mechanisms are not required with the present invention where the rotary and lifting output motions of tne single drive unit 24 are always in timed sequence due to the fact that its two cam members (not shown) are rigidly keyed to a common cam drive shaft 32.

Further, with the raised hub 56 on output dial mounting plate 26 and the attachment thereto of the crank arm 90 which carries the roller follower 93, the rotary motion generated by drive unit 24 can be converted into a horizontal sliding action as is seen by, i.e., transferred to, the horizontal slide carriage assembly 78 through mounting track 88. Additionally, the four-point contact bearing 94, which supports and vertically moves the lift carriage assembly 62, but without causing rotation thereof whenever the output dial mounting plate 26 is rotated, permits the output dial mounting plate 26 to generate both a lift motion as well as a linear sliding motion for the improved walking beam drive unit 20. This is because the bearing 94 supports the lift carriage 62 for vertical movement by the mounting plate 26 yet permits rotation of the mounting plate 26 without causing rotation of the lift carriage 62.

It will be understood that other type connections between the lift carriage assembly 62 and the horizontal slide carriage assembly 78 can be utilized. For example, the horizontal guide rods 82 and bearings 83 could be changed to roller followers carried by side bars on the slide carriage 62 which followers would ride within captive tracks formed on lift beam 64.

Also, it will be understood that the preferred embodiment of the improved walking beam drive apparatus of the present invention can be oriented for operation in different positions than shown in the attached Figures (such as, for example, where the horizontal sliding motion of slide carriage 62 actually becomes a vertical slide motion due to the apparatus' orientation) without changing or affecting the apparatus' operation.

From the foregoing, it is believed that those skilled in the art will readily appreciate the unique features and advantages of the present invention over previous types of walking beam drive units. Further, it is to be understood that while the present invention has been described in relation to a particular preferred embodiment as set forth in the accompanying drawings and as above described, the same nevertheless is susceptible to change, variation and substitution of equivalents without departure from the spirit and scope of this invention. It is therefore intended that the present invention be unrestricted by the foregoing description and drawings, except as may appear in the following appended claims.

I claim:

1. A walking beam drive apparatus comprising in combination:

a cam-actuated single drive member including two drive cams affixed to a common cam shaft so as to constantly remain in timed relationship one with the other, and an output member operatively driven by said two drive cams and providing both rotary and lifting output motions;

rotary motion transfer means carried by said output member;

lift carriage assembly means supported upon said output member for linear reciprocation along a first direction;

slide carriage assembly means supported upon said lift carriage assembly means for sliding movement relative thereto along a second direction which is normal to said first direction;

bearing connection means operatively mounted between said output member and said lift carriage assembly means, whereby rotary motion of said output member is permitted without being transferred to said lift carriage assembly means; and means drivably interconnecting said rotary motion transfer means with said slide carriage assembly means, whereby rotary motion of said output member and said rotary motion transfer means carried thereby is converted into sliding motion of said slide carriage assembly means relative to said lift carriage assembly means.

2. The invention of claim 1, wherein said rotary motion transfer means comprises crank arm means affixed to said rotary output member, and further, said means drivably interconnecting said rotary motion transfer means with said slide carriage assembly means comprises roller follower means carried by said crank arm means which rides within captive yoked track means carried by said slide carriage assembly means.

3. The invention of claim 1, wherein said lift carriage assembly means comprises an elongated lift beam having a central section rotatably supported on said output member by said bearing means, and stationary guide post members about which said lift beam is linearly reciprocated by said output member, said stationary guide post members operating to stabilize said lift beam against rotation.

4. The invention of claim 1, wherein said slide carriage assembly means comprises slide rod members slidingly supported upon said lift carriage assembly means, said slide rod means each connected at at least one end thereof.

5. The invention of claim 1, wherein said lift carriage assembly means linearly reciprocates along a vertical direction and said slide carriage assembly means linearly reciprocates along a horizontal direction.

6. The invention of claim 1, wherein said bearing connection means comprises a four-point contact bearing having one bearing ring affixed to said output member and the other bearing ring affixed to said lift carriage assembly means.

7. The invention of claim 3, wherein the sliding support of said slide carriage assembly means by said lift carriage assembly means is produced by slide rod means slidingly received within linear bearing means carried by elongated portions formed at the respective ends of said lift beam.

8. Apparatus for converting a rotary pick-and-place drive apparatus of the type having an output member which produces both rotary and lifting motions into a walking beam drive apparatus, the improvement comprising:

rotary motion transfer means operatively connected to the output member;

lift carriage means comprising a lift beam member rotatably supported upon the output member by bearing means, and stationary guide post means to which said lift beam member is slidingly connected and along which said lift beam member can linearly reciprocate, whereby the lifting motion of the output member is transferred to said lift beam member while the rotary motion of the output member is not so transferred;

slide carriage means supported upon said lift carriage means for linear sliding movement relative thereto in a direction normal to the linear reciprocation of said lift carriage means;

and means operatively connecting said slide carriage means with said rotary motion transfer means whereby rotary motion of the output member is transferred into linear sliding movement of said slide carriage means.

* * * * *